March 7, 1950     W. SCHADE     2,500,046
PETZVAL-TYPE PHOTOGRAPHIC OBJECTIVE
Filed Jan. 3, 1948
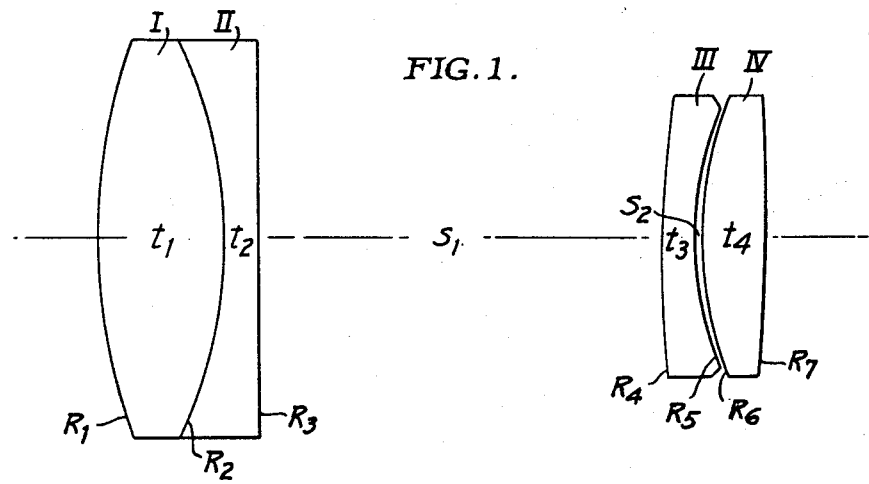
FIG. 1.
FIG. 2.
| LENS | N | V | RADII | THICKNESSES |
|---|---|---|---|---|
| I | 1.523 | 58.6 | $R_1 = +70.97$ mm | $t_1 = 15.0$ mm |
| II | 1.617 | 38.5 | $R_2 = -56.79$ | $t_2 = 4.5$ |
|  |  |  | $R_3 = \infty$ | $S_1 = 49.3$ |
| III | 1.649 | 33.8 | $R_4 = +119.91$ | $t_3 = 3.8$ |
|  |  |  | $R_5 = +40.87$ | $S_2 = 0.9$ |
| IV | 1.697 | 56.1 | $R_6 = +46.87$ | $t_4 = 7.5$ |
|  |  |  | $R_7 = -282.05$ | $BF = 56.5$ |
FIG. 3.
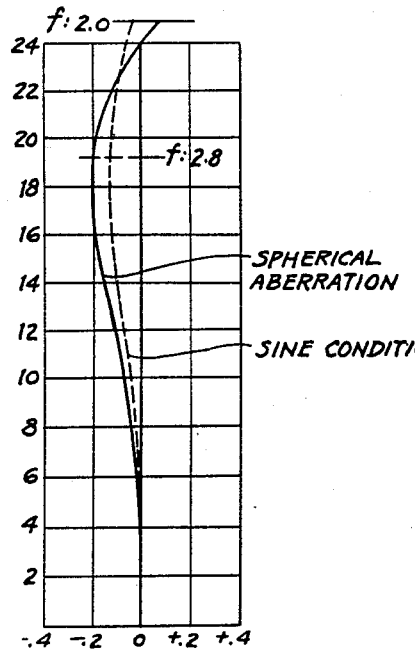
FIG. 4.
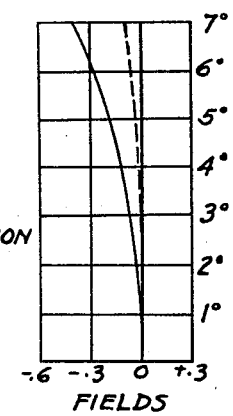
WILLY SCHADE
INVENTOR
BY
ATTORNEY & AGENT Patented Mar. 7, 1950

2,500,046

UNITED STATES PATENT OFFICE 2,500,046

PETZVAL-TYPE PHOTOGRAPHIC OBJECTIVE

Willy Schade, Rochester, N. Y., assignor to Eastman Kodak Company, Rochester, N. Y., a corporation of New Jersey Application January 3, 1948, Serial No. 398

3 Claims. (Cl. 88—57)

This invention relates to photographic objectives of the well-known Petzval type, widely used for taking and projecting motion pictures and for portrait photography.

The object of the invention is to provide a photographic objective consisting of only four elements which produces a sharper image over a moderate field of ±8° or 10° than any such inexpensive objective heretofore known.

The portrait objective invented by J. Petzval over 100 years ago and known as the Petzval objective is with minor modifications still widely used. Objectives of this type consist of two substantially achromatic positive doublets spaced apart by a distance usually greater than 0.25 F and less than F, where F is the focal length of the objective, although some known examples lie outside this range.

In the original Petzval objective, the front doublet was cemented and the rear doublet airspaced, each doublet having its negative element adjacent to the central airspace. In lenses of this original type, the total thickness of each doublet is usually less than 0.25 F. In later forms, both doublets were cemented or both airspaced or additional elements were combined therewith. In one case a negative element was added near the focal plane to flatten the field.

In lens art in general, it is known that a higher refractive index in positive elements decreases the Petzval sum and thus aids in the correction of curvature of field and astigmatism. Although both discoveries are named after the same man, the Petzval lens has always been the outstanding example of lenses not corrected for Petzval sum. Also it is not generally possible to predict in which element of a complex system a high index would be most beneficial or what other lens characteristics such as curvatures are necessary to take advantage of the benefits of the higher indices. Although high index, moderate dispersion glasses have been known for many years and have been incorporated in many types of lenses, they have not previous to the present invention, been found useful in Petzval lenses of this simple type.

According to the present invention, a photographic objective of the original Petzval type is made up in which the positive element of the rear doublet has a refractive index higher than that of the negative element thereof, but preferably not more than 0.08 higher. The latter element preferably has an index between 1.61 and 1.68. Still denser flint glasses may be used, but they suffer from an undesirable yellow coloration.

To obtain the best results with this combination of refractive indices, I make the rear airspaced doublet biconvex in outward form such that the sum of the curvatures of its front and rear surfaces is between 1/F and 1.4/F, the curvature of its rear surface is between 0.2 and 0.5 times that of its front surface, and its two interior surfaces have radii of curvature differing by less than 0.07 F and enclose an airspace having the shape of a positive meniscus lens element. The radii of curvature of said two interior surfaces individually lie in the ordinary range from 0.35 to 0.6 F as found in the prior art; it is by making them more nearly equal than has heretofore been done that I obtain superior results. When conforming to the above-described limitations, the radius of curvature of the front surface of the rear component is always between 6 F/7 or approximately 0.9 F and 1.6 F and that of the rear surface is numerically between 40 F/21 (or approximately 2 F) and 6 F.

According to a preferred feature of the invention, the focal length of the front doublet is longer than that of the rear doublet, but not more than three-halves as long. Heretofore, it has been usual to make the front doublet with the shorter focal length of the two, and even as short as three-fifths that of the rear doublet in some instances.

I have found that the shape of the front doublet which gives the best coma correction is roughly the same as in the prior art, that is the front surface is convex and has a radius of curvature between $0.35 f_1$ and $0.45 f_1$ where $f_1$ is the focal length of the front doublet. On account of the long focal length of the front doublet, however, the front surface has an unusually long radius of curvature, between 0.6 F and 0.8 F, in objectives having the above described preferred feature of the invention.

I have also found that the high index glass is of much greater benefit in the rear element than it would be in the positive element of the front component. In fact, increasing the index of the front positive element by any considerable amount relative to that of the front negative element would require a more strongly curved cemented surface and would actually make the zonal spherical aberration of the objective worse instead of better.

Accordingly, I use rather ordinary refractive indices in the front component. I prefer the refractive index of the negative element thereof to be between 1.61 and 1.68, as is that of the rear negative element, and I prefer the refractive index of the positive element cemented thereto to be lower by between 0.06 and 0.15.

In respect to the spacing apart of the two doublets, the ordinary range from 0.25 F to F is generally preferable.

The curvature of the cemented surface of the front doublet is determined by the requirements for the correction of spherical aberration, as is well known to skilled lens designers. It usually falls between $0.25 f_1$ and $0.4 f_1$.

The dispersive indices of the glasses are chosen in known manner so as to correct the axial and lateral color. The dispersive indices $V_2$ and $V_3$ of the second and third elements are less than 50. That of the front element $V_1$ is within the range $V_2$ $(2.4 D+1.3\pm0.15)$ where D is the difference in refractive index between the front two lens elements. Finally the dispersive index $V_4$ of the rear element is within the range $V_3$ $(1.65\pm0.15)$. The dispersive indices of the negative elements may be as small as available materials permit. If crystalline materials are considered, the limit is about 23. As regards non-crystalline materials, a series of high dispersion fluosilicate glasses are described in a copending application, Serial No. 644,182, Sun, filed January 29, 1946, now Patent No. 2,481,701, dated September 13, 1949, which extend almost to 26 in dispersive index.

In the accompanying drawing:

Fig. 1 shows an objective according to the invention;

Fig. 2 gives data for one example;

Figs. 3 and 4 show the axial aberrations and field curvatures, respectively, for the lens shown in Figs. 1 and 2.

The data given in Fig. 2 are for an objective with a focal length of 100 mm. and are repeated in the following table:

| Lens | N | V | Radii | Thicknesses and Separations |
|---|---|---|---|---|
| I | 1.523 | 58.6 | $R_1=+ 70.97$ mm. | $t_1=15.0$ mm. |
| II | 1.617 | 38.5 | $R_2=- 56.79$ | $t_2= 4.5$ |
|  |  |  | $R_3=\infty$ | $s_1=49.3$ |
| III | 1.649 | 33.8 | $R_4=+119.91$ | $t_3= 3.8$ |
|  |  |  | $R_5=+ 40.87$ | $S_2= 0.9$ |
| IV | 1.697 | 56.1 | $R_6=+ 46.87$ | $t_4= 7.5$ |
|  |  |  | $R_7=-282.05$ | $BF=56.5$ |

In this table, the lens elements are numbered by Roman numerals from front to rear. The refractive indices N for the D line of the spectrum and the dispersive indices V are given in the second and third columns for each lens element. The radii of curvature R, thicknesses t, and spaces S are each numbered by subscripts from front to rear, and the $+$ and $-$ values of the radii indicate surfaces that are respectively convex and concave to the front. Also BF denotes the back focal length.

The broad and preferred features of the invention and also the useful features of prior art, are set forth in the following table, and the corresponding numerical values for the above example are given in the last column.

$0.25\ F<S_1<F$ ... $0.49\ F$
$f_2<f_1<1.5\ f_2$ ... $1.2\ f_2$
$0.35\ f_1<R_1<0.45\ f_1$ ... $0.4\ f_1$
$0.6\ F<R_1<0.8\ F$ ... $0.71\ F$
$0.25\ f_1<-R_2<0.4\ f_1$ ... $0.32\ f_1$
$F<f_1<2.3\ F$ ... $1.8\ F$
$\frac{1}{F}<\left(\frac{1}{R_4}-\frac{1}{R_7}\right)<\frac{1.4}{F}$ ... $\frac{1.19}{F}$
$0.2\ R_7<-R_4<0.6\ R_7$ ... $0.43\ R_7$
$+R_5<+R_6<(R_5+0.07\ F)$ ... $(R_5+0.06\ F)$
$0.35\ F<+R_5$ ... $+0.41\ F$
$+R_6<0.6\ F$ ... $+0.47\ F$
$1.61<N_2<1.68$ ... $1.62$
$0.06<(N_2-N_1)<0.15$ ... $0.09$
$1.61<N_3<1.68$ ... $1.65$
$N_3<N_4<(N_3+0.08)$ ... $(N_3+0.05)$
$23<V_2<50$ ... $38$
$V_2(2.4\ D+1.15)<V_1<V_2(2.4\ D+1.45)$ ... $V_2(2.4\ D+1.30)$
$23<V_3<50$ ... $33.8$
$1.5\ V_3<V_4<1.8\ V_3$ ... $1.67\ V_3$ In this table, $f_1$ and $f_2$ are the focal lengths of the front and rear doublets, respectively, the refractive indices N and the dispersive indices V are numbered by subscripts in order from front to rear, and $D=(N_2-N_1)$.

Figs. 3 and 4 show the excellent state of correction of the aberrations attained by the combination of all these features. In Fig. 3 the solid line indicates spherical aberration or the difference in "back focal length" from zone to zone of the lens, and the broken line indicates the sine condition error or the difference in "equivalent focal length." The ordinate is the semi-aperture, that is the height of incidence on the first surface. In Fig. 4 the solid line indicates the sagittal or secondary curvature and the broken line the tangential or primary curvature of the image computed for principal rays crossing the axis 18.9 mm. behind the front doublet.

The invention improves the flatness of field to a degree making unnecessary the use of a negative element near the focal plane in most cases. However, such an element may be added, if desired, as in the prior art.

What I claim is:

1. A photographic objective consisting of two substantially achromatic positive doublets spaced apart by more than $0.25\ F$ and less than F, where F is the focal length of the objective, the front doublet having a focal length between 1.0 and 1.5 times that of the other, the front doublet consisting of a biconvex element cemented to the front of a negative element of higher refractive index, the rear doublet being biconvex in outward form and consisting of a negative element whose refractive index is between 1.61 and 1.68 spaced from a rear biconvex element therebehind and enclosing therewith an air space having the shape of a positive meniscus lens element, characterized by the rear biconvex element having a refractive index higher than that of the adjacent negative element but not more than 0.08 higher, by the sum of the curvatures of the two outer surfaces of the rear doublet being between $1/F$ and $1.4/F$, and by the two inner surfaces of the rear component having radii of curvature which differ by less than $0.07\ F$.

2. A photographic objective comprising a front cemented doublet and a rear air spaced doublet, each with an axial thickness less than $0.25\ F$ where F is the focal length of the objective, in which the focal lengths f of the doublets, the radii R of the lens surfaces, the refractive indices N and dispersive indices V of the lens elements each numbered in order from front to rear and also the central space $S_1$ are within the limits specified as follows:

$0.25\ F<S_1<F$
$f_2<f_1<1.5\ f_2$
$0.35\ f_1<R_1<0.45\ f_1$
$0.25\ f_1<-R_2<0.4\ f_1$
$F<f_1<2.3\ F$
$0.9\ F<R_4<1.6\ F$
$0.35\ F<R_5<R_6<0.6\ F$
$R_6<(R_5+0.07\ F)$
$2\ F<-R_7<6\ F$
$1.61<N_2<1.68$
$0.06<(N_2-N_1)<0.15$
$1.61<N_3<1.68$
$N_3<N_4<(N_3+0.08)$
$23<V_2<50$
$V_2(2.4\ D+1.15)<V_1<V_2(2.4\ D+1.45)$
$23<V_3<50$
$1.5\ V_3<V_4<1.8\ V_3$ where D denotes the index difference $(N_2-N_1)$ and where the $+$ and $-$ values of radii R indicate surfaces respectively convex and concave to the front.

3. An objective substantially according to the following specifications:

| Lens | N | V | Radii | Thicknesses and Separations |
|---|---|---|---|---|
| 1 | 1.52 | 59 | $R_1 = +0.7 F$ | $t_1 = 0.15 F$ |
| 2 | 1.62 | 39 | $R_2 = -0.6 F$ | $t_2 = 0.04 F$ |
|   |      |    | $\pm R_3 > 6 F$ | $S_1 = 0.5 F$ |
| 3 | 1.65 | 34 | $R_4 = +1.2 F$ | $t_3 = 0.04 F$ |
|   |      |    | $R_5 = +0.4 F$ | $S_2 < 0.02 F$ |
| 4 | 1.70 | 56 | $R_6 = +0.46 F$ | $t_4 = 0.07 F$ |
|   |      |    | $R_7 = -2.8 F$ |   | where the second and third columns give the refractive index N relative to the D line of the spectrum and the dispersive index V for the respective lens elements as numbered in the first column from front to rear of the objective, where R, t, and S denote the radii of curvature, lens thicknesses and spacings each numbered by subscripts from front to rear, and where the + and − values of radii indicate surfaces respectively convex and concave to the front and F is the focal length of the objective as a whole.

WILLY SCHADE.

REFERENCES CITED

The following references are of record in the file of this patent:

UNITED STATES PATENTS

| Number | Name | Date |
|---|---|---|
| 65,729 | Dallmeyer | June 11, 1867 |
| 1,415,002 | Repp | May 2, 1922 |
| 1,484,853 | Warmishan | Feb. 26, 1924 |
| 1,843,519 | Richter | Feb. 2, 1932 |
| 2,430,587 | Schade | Nov. 11, 1947 |

FOREIGN PATENTS

| Number | Country | Date |
|---|---|---|
| 481,830 | Germany | Aug. 31, 1929 |